(12) United States Patent
Kojima (10) Patent No.: US 11,404,993 B2
(45) Date of Patent: Aug. 2, 2022

(54) MOTOR DRIVE SYSTEM AND ROBOT (71) Applicant: SEIKO EPSON CORPORATION, Tokyo (JP)

(72) Inventor: Takashi Kojima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/118,627

(22) Filed: Dec. 11, 2020

(65) Prior Publication Data

US 2021/0194406 A1 Jun. 24, 2021

(30) Foreign Application Priority Data

Dec. 13, 2019 (JP) .............................. JP2019-225842

(51) Int. Cl.
| | |
|---|---|
| *H02H 3/04* | (2006.01) |
| *H02P 29/024* | (2016.01) |
| *B25J 9/12* | (2006.01) |
| *H02P 27/06* | (2006.01) |
| *B25J 9/04* | (2006.01) |

(52) U.S. Cl.
CPC ............ *H02P 29/0241* (2016.02); *B25J 9/12* (2013.01); *H02P 27/06* (2013.01); *B25J 9/042* (2013.01)

(58) Field of Classification Search
CPC ......... H02P 29/0241; H02P 27/06; B25J 9/12; B25J 9/1674; B25J 19/06; G05B 19/0428
See application file for complete search history.

(56) References Cited

FOREIGN PATENT DOCUMENTS

| CN | 207516763 U | * | 6/2018 | |
|---|---|---|---|---|
| EP | 1933467 A2 | * | 6/2008 | ........... G05D 1/0225 |
| JP | S62140795 A | | 6/1987 | |
| JP | H07281771 A | | 10/1995 | |
| JP | H07327366 A | | 12/1995 | |

* cited by examiner

*Primary Examiner* — Karen Masih
(74) *Attorney, Agent, or Firm* — Gang Yu (57) ABSTRACT

A motor drive system includes a motor, a drive control circuit controlling driving of the motor, a power supply device having a first power supply coupled to a reference potential and a second power supply series-coupled to the first power supply, and supplying a second voltage as a sum value of a first voltage as an output voltage of the first power supply and an output voltage of the second power supply to the drive control circuit, and a monitoring circuit detecting the first voltage and the second voltage and shutting off or reducing electric power supply to the drive control circuit when the detected first voltage becomes a predetermined first set value or more or the detected second voltage becomes a predetermined second set value or more, wherein electric power for driving is supplied to the monitoring circuit from between the first power supply and the second power supply.

7 Claims, 5 Drawing Sheets

MOTOR DRIVE SYSTEM AND ROBOT

The present application is based on, and claims priority from JP Application Serial Number 2019-225842, filed Dec. 13, 2019, the disclosure of which is hereby incorporated by reference herein in its entirety.

BACKGROUND

1. Technical Field

The present disclosure relates to a motor drive system and a robot.

2. Related Art

Recently, in factories, due to labor cost rise and labor shortage, work manually performed in the past has been increasingly automated by various robots and robot peripherals. Further, for upsizing of robot arms of robots and increasing driving speeds of the robots, it is necessary to increase electric power supplied to motors that drive the robot arms. To realize that, for example, a power supply circuit as shown in JP-A-62-140795 may be used. In the power supply circuit in JP-A-62-140795, the output voltage is increased by series coupling of the power supply.

It is assumed that the voltage supplied to the motor becomes excessively higher due to e.g. a power supply failure. In this case, the motor may fail or the velocity of the robot arm may become excessively higher. To prevent that, a monitoring circuit that detects whether or not the power supply is normally actuated is used. When the monitoring circuit detects the voltage of the power supply and the detected voltage becomes equal to or larger than a threshold value, the electric power supply to the motor may be stopped. It is necessary that the failure voltage of the monitoring circuit is sufficiently larger than the output voltage of the monitored power supply.

However, as described above, it is necessary to increase the failure voltage of the monitoring circuit with the increase of the output voltage of the power supply, and thus, a large-scaled monitoring circuit is used and increase in size and cost is caused as the whole apparatus.

SUMMARY

The present disclosure has been achieved to solve at least a part of the above described problem and can be realized as below.

A motor drive system according to an application example includes a motor, a drive control circuit that controls driving of the motor, a power supply device having a first power supply coupled to a reference potential and a second power supply series-coupled to the first power supply, and supplying a second voltage as a sum value of a first voltage as an output voltage of the first power supply and an output voltage of the second power supply to the drive control circuit, and a monitoring circuit that detects the first voltage and the second voltage and shuts off or reduces electric power supply to the drive control circuit when the detected first voltage becomes equal to or larger than a predetermined first set value or the detected second voltage becomes equal to or larger than a predetermined second set value, wherein electric power for driving is supplied to the monitoring circuit from between the first power supply and the second power supply.

A robot according to an application example includes a robot arm, a motor that drives the robot arm, a drive control circuit that controls driving of the motor, a power supply device having a first power supply coupled to a reference potential and a second power supply series-coupled to the first power supply, and supplying a second voltage as a sum value of a first voltage as an output voltage of the first power supply and an output voltage of the second power supply to the drive control circuit, and a monitoring circuit that detects the first voltage and the second voltage and shuts off or reduces electric power supply to the drive control circuit when the detected first voltage becomes equal to or larger than a predetermined first set value or the detected second voltage becomes equal to or larger than a predetermined second set value, wherein electric power for driving is supplied to the monitoring circuit from between the first power supply and the second power supply.

DESCRIPTION OF EXEMPLARY EMBODIMENTS

As below, a motor drive system and a robot according to the present disclosure will be explained in detail based on preferred embodiments shown in the accompanying drawings.

First Embodiment

Figure 1:
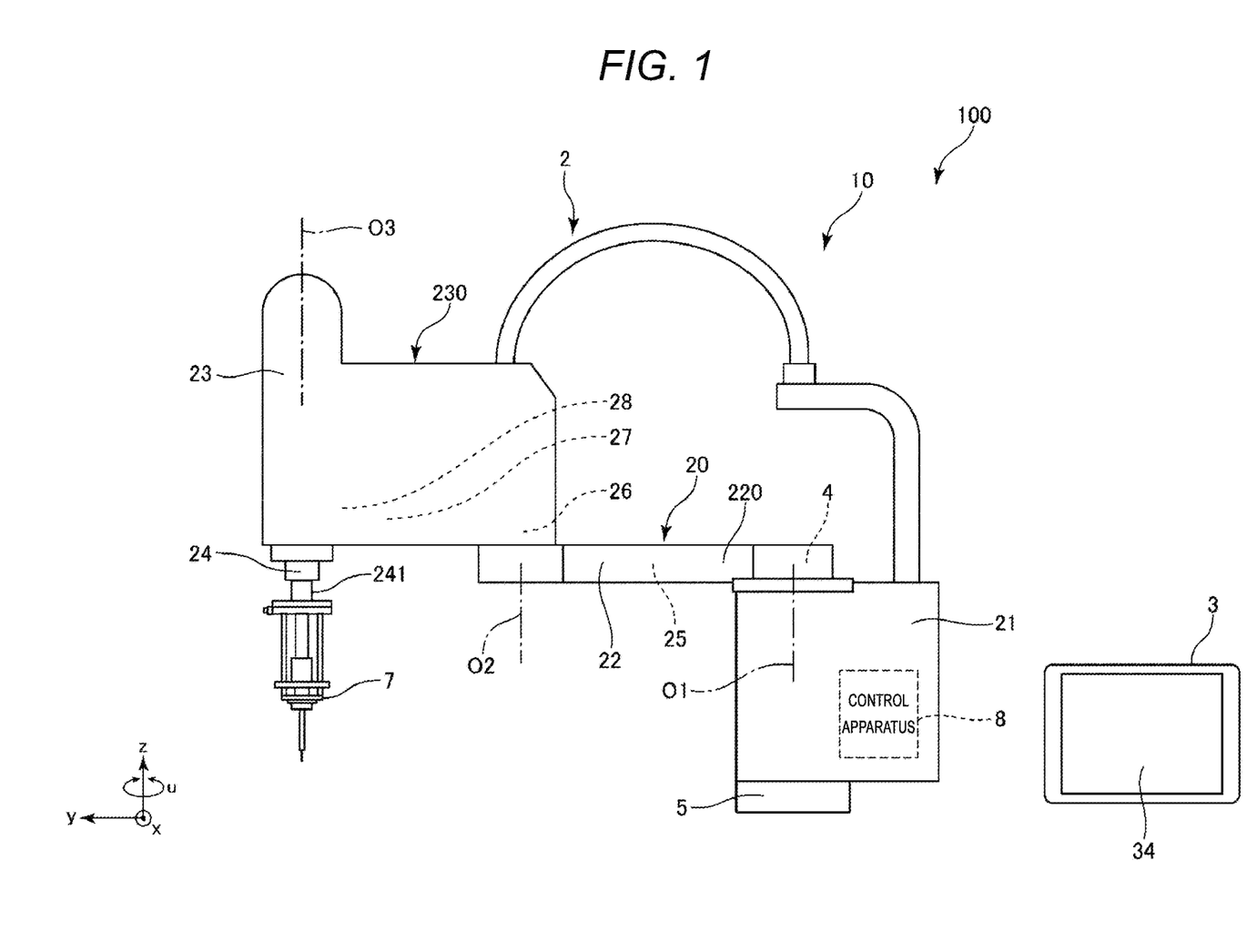
FIG. 1 is a schematic configuration diagram of a robot system including a first embodiment of a motor drive system according to the present disclosure.
Figure 2:
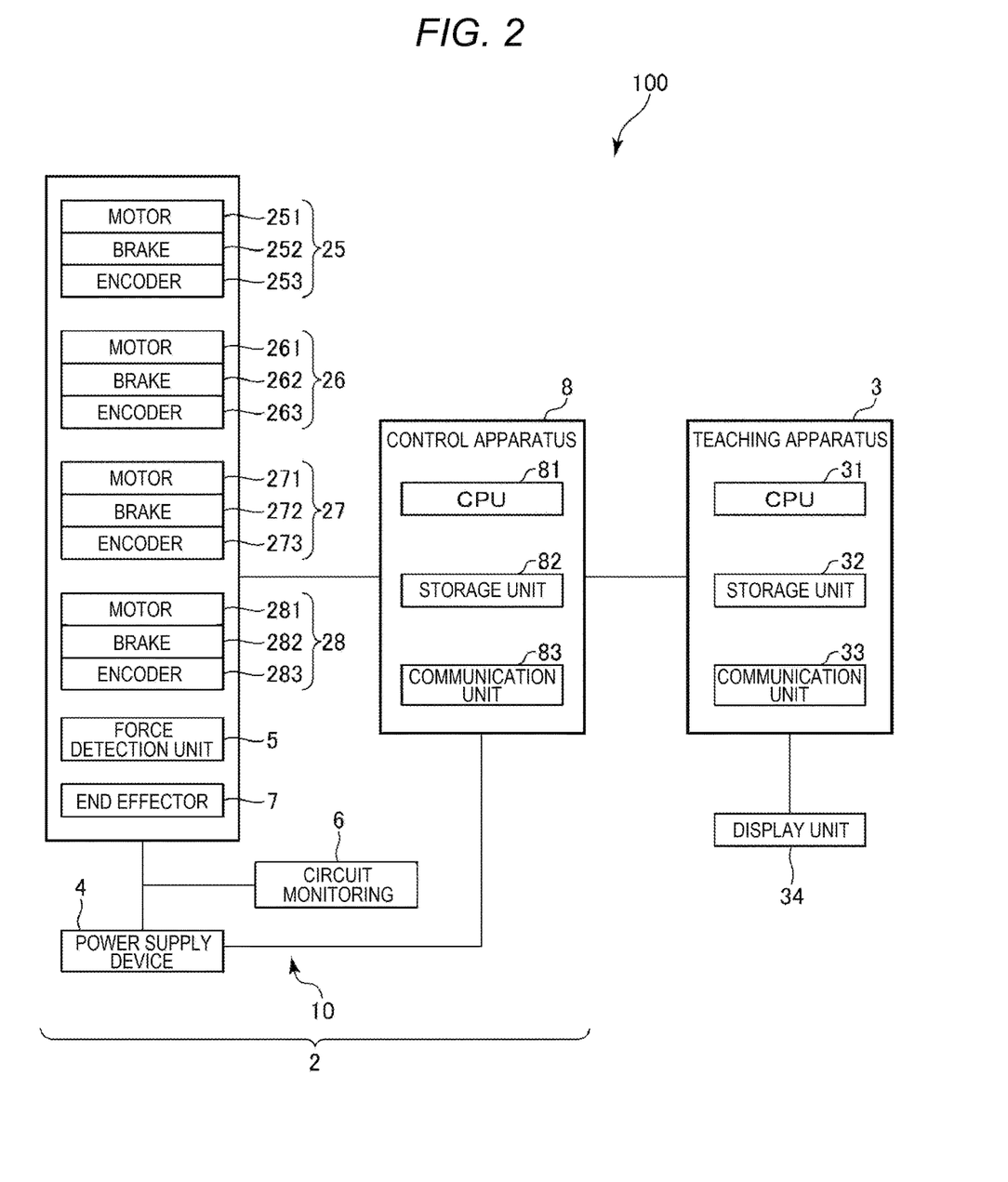
FIG. 2 is a block diagram of the robot system shown in FIG. 1.
Figure 3:
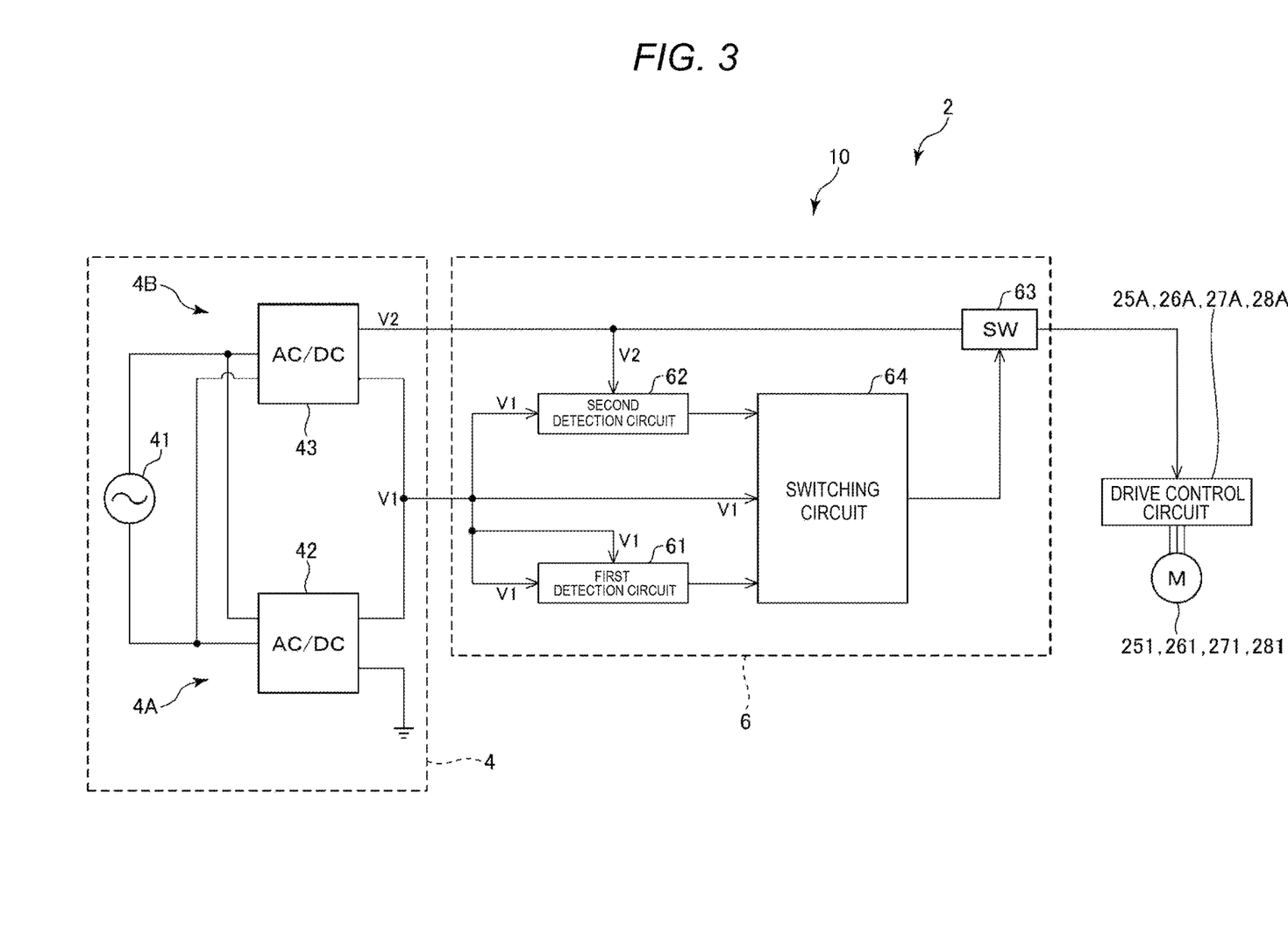
FIG. 3 is a functional block diagram of the motor drive system shown in FIG. 1.
Figure 4:
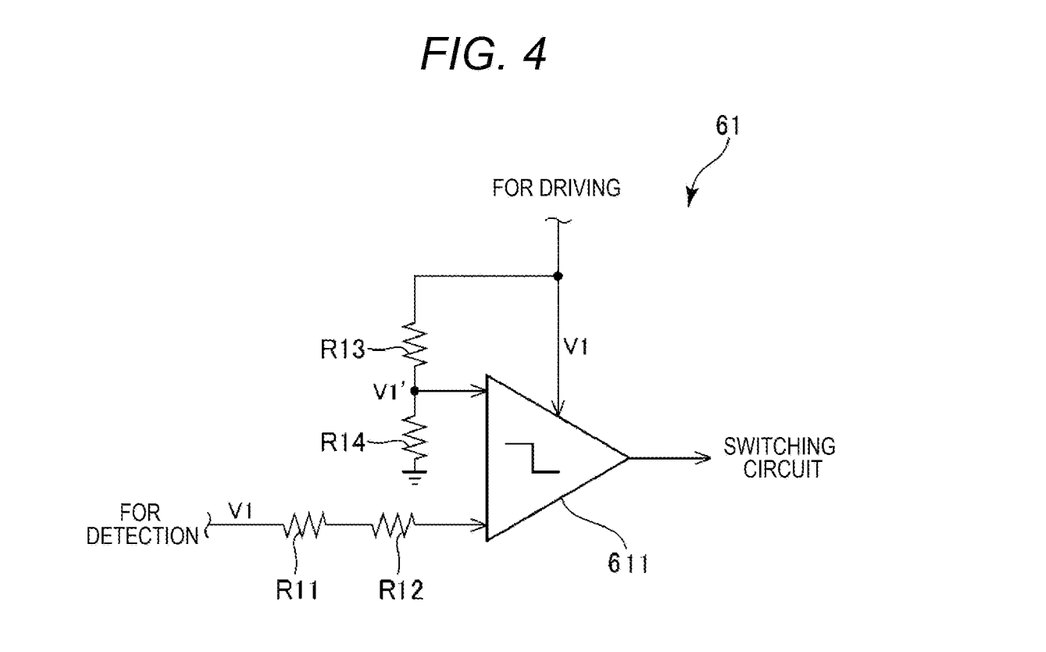
FIG. 4 is a circuit diagram showing a first comparator provided in a first detection circuit shown in FIG. 3.
Figure 5:
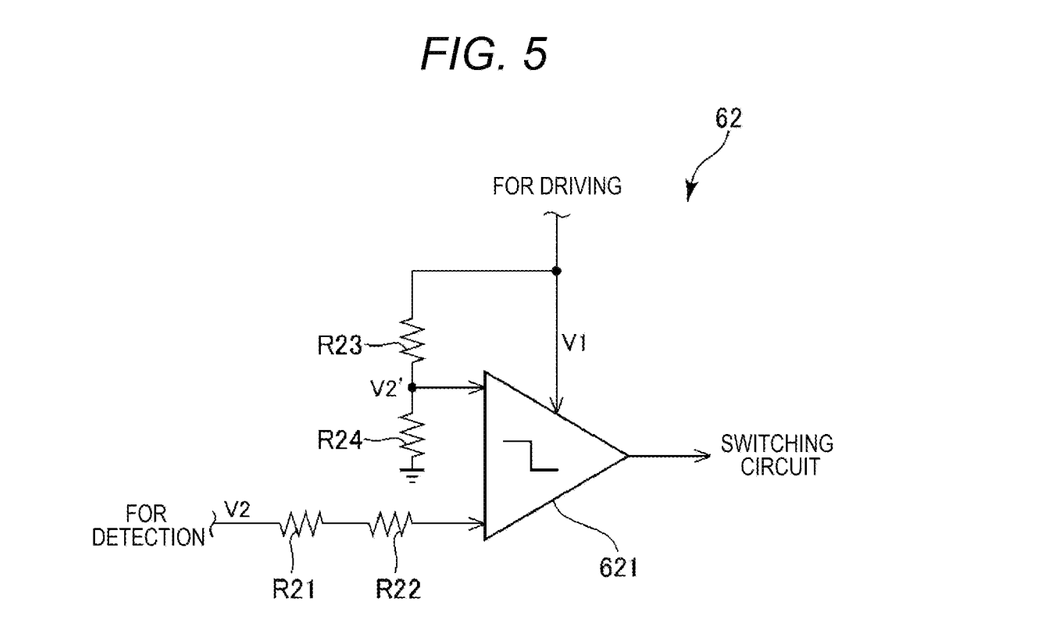
FIG. 5 is a circuit diagram showing a second comparator provided in a second detection circuit shown in FIG. 3.

FIG. 1 is a schematic configuration diagram of a robot system including a first embodiment of a motor drive system according to the present disclosure. FIG. 2 is a block diagram of the robot system shown in FIG. 1. FIG. 3 is a functional block diagram of the motor drive system shown in FIG. 1. FIG. 4 is a circuit diagram showing a first comparator provided in a first detection circuit shown in FIG. 3. FIG. 5 is a circuit diagram showing a second comparator provided in a second detection circuit shown in FIG. 3.

In FIG. 1, for convenience of explanation, an x-axis, a y-axis, and a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, the pointer sides of the respective arrows shown in the drawings are also referred to as "+(plus)" and the tail sides are also referred to as "−(minus)". The directions about the z-axis and the directions about an axis parallel to the z-axis are also referred to as "u-directions".

Hereinafter, for convenience of explanation, the +z-axis direction, i.e., the upside in FIG. 1 is also referred to as "upper" or "above" and the −z-axis direction, i.e., the downside is also referred to as "lower" or "below". Further, with respect to a robot arm 20, a base 21 side in FIG. 1 is referred to as "proximal end" and the opposite side, i.e., an end effector 7 side is referred to as "distal end". Furthermore, the z-axis directions, i.e., upward and downward directions in FIG. 1 are referred to as "vertical directions" and the x-axis directions and the y-axis directions, i.e., leftward and rightward directions are referred to as "horizontal directions".

A robot system 100 shown in FIGS. 1 and 2 is used for work of e.g. holding, transport, assembly, inspection, etc. of workpieces including electronic components and electronic apparatuses. The robot system 100 includes a robot 2, and a teaching apparatus 3 that teaches a motion program to the robot 2. Further, the robot 2 and the teaching apparatus 3 can communicate via wired connection or wireless connection and the communication may be made via a network such as the Internet.

A motor drive system 10 is provided inside of the robot 2. As shown in FIG. 3, the motor drive system 10 includes a motor 251, a motor 261, a motor 271, and a motor 281, a power supply device 4, and a monitoring circuit 6, which will be described later.

First, the robot 2 is explained.

The robot 2 is a horizontal articulated robot, i.e., a scalar robot in the illustrated configuration. As shown in FIGS. 1 and 2, the robot 2 includes a base 21, the robot arm 20 coupled to the base 21, a force detection unit 5, an end effector 7, and a control apparatus 8 that controls actuation of these respective units.

The base 21 is a part supporting the robot arm 20. In the base 21, the control apparatus 8, which will be described later, is provided. Further, in an arbitrary portion of the base 21, the origin of the robot coordinate system is set. Note that the x-axis, the y-axis, and the z-axis shown in FIG. 1 are the axes of the robot coordinate system.

The robot arm 20 includes a first arm 22, a second arm 23, and a third arm 24 as a working head. The coupling portion of the base 21 and the first arm 22, the coupling portion of the first arm 22 and the second arm 23, and the coupling portion of the second arm 23 and the third arm 24 are also referred to as "joints".

Note that the robot 2 is not limited to the illustrated configuration, but the number of arms may be one, two, four, or more.

Further, the robot 2 includes a drive unit 25 that rotates the first arm 22 relative to the base 21, a drive unit 26 that rotates the second arm 23 relative to the first arm 22, a u-drive unit 27 that rotates a shaft 241 of the third arm 24 relative to the second arm 23, and a z-drive unit 28 that moves the shaft 241 in the z-axis directions relative to the second arm 23.

As shown in FIGS. 1 and 2, the drive unit 25 is provided inside of a housing 220 of the first arm 22 and has the motor 251 that generates a drive force, a brake 252, a reducer (not shown) that reduces the drive force of the motor 251, and an encoder 253 that detects the rotation angle of the rotation shaft of the motor 251 or the reducer.

The drive unit 26 is provided inside of a housing 230 of the second arm 23 and has the motor 261 that generates a drive force, a brake 262, a reducer (not shown) that reduces the drive force of the motor 261, and an encoder 263 that detects the rotation angle of the rotation shaft of the motor 261 or the reducer.

The u-drive unit 27 is provided inside of the housing 230 of the second arm 23 and has the motor 271 that generates a drive force, a brake 272, a reducer (not shown) that reduces the drive force of the motor 271, and an encoder 273 that detects the rotation angle of the rotation shaft of the motor 271 or the reducer.

The z-drive unit 28 is provided inside of the housing 230 of the second arm 23 and has the motor 281 that generates a drive force, a brake 282, a reducer (not shown) that reduces the drive force of the motor 281, and an encoder 283 that detects the rotation angle of the rotation shaft of the motor 281 or the reducer.

As the motor 251, the motor 261, the motor 271, and the motor 281, e.g. servo motors such as AC servo motors or DC servo motors may be used. As the reducers, e.g. planet gear reducers, wave gearings, or the like may be used.

The brake 252, the brake 262, the brake 272, and the brake 282 have functions of decelerating the robot arm 20. Specifically, the brake 252 reduces the motion velocity of the first arm 22, the brake 262 reduces the motion velocity of the second arm 23, the brake 272 reduces the motion velocity of the third arm 24 in the u-directions, and the brake 272 reduces the motion velocity of the third arm 24 in the z-axis directions.

The brake 252, the brake 262, the brake 272, and the brake 282 include electromagnetic brakes, mechanical brakes, hydraulic brakes, and pneumatic brakes.

The drive unit 25 is coupled to a drive control circuit 25A as a motor driver. The drive control circuit 25A controls actuation of the drive unit 25, i.e., the motor 251 according to an energization condition from the power device 4 to be described later.

The drive unit 26 is coupled to a drive control circuit 26A as a motor driver. The drive control circuit 26A controls actuation of the drive unit 26, i.e., the motor 261 according to an energization condition from the power device 4 to be described later.

The u-drive unit 27 is coupled to a drive control circuit 27A as a motor driver. The drive control circuit 27A controls actuation of the u-drive unit 27, i.e., the motor 271 according to an energization condition from the power device 4 to be described later.

The z-drive unit 28 is coupled to a drive control circuit 28A as a motor driver. The drive control circuit 28A controls actuation of the z-drive unit 28, i.e., the motor 281 according to an energization condition from the power device 4 to be described later.

The base 21 is fixed to e.g. a floor surface (not shown) by bolts or the like. The first arm 22 is coupled to the upper end portion of the base 21. The first arm 22 is rotatable about a first axis O1 along the vertical directions relative to the base 21. When the drive unit 25 that rotates the first arm 22 drives, the first arm 22 rotates within a horizontal plane about the first axis O1 relative to the base 21. The encoder 253 is configured to detect the amount of rotation of the first arm 22 relative to the base 21.

The second arm 23 is coupled to the distal end portion of the first arm 22. The second arm 23 is rotatable about a second axis O2 along the vertical directions relative to the first arm 22. The axial direction of the first axis O1 and the axial direction of the second axis O2 are the same. That is, the second axis O2 is parallel to the first axis O1. When the drive unit 26 that rotates the second arm 23 drives, the second arm 23 rotates within a horizontal plane about the second axis O2 relative to the first arm 22. The encoder 263 is configured to detect the amount of driving, specifically, the amount of rotation of the second arm 23 relative to the first arm 22.

The third arm 24 is placed and supported in the distal end portion of the second arm 23. The third arm 24 has the shaft 241. The shaft 241 is rotatable about a third axis O3 along the vertical directions relative to the second arm 23 and movable in the upward and downward directions. The shaft 241 is the arm at the most distal end of the robot arm 20.

When the u-drive unit 27 that rotates the shaft 241 drives, the shaft 241 rotates about the z-axis. Further, the encoder 273 is configured to detect the amount of rotation of the shaft 241 relative to the second arm 23.

When the z-drive unit 28 that moves the shaft 241 in the z-axis directions drives, the shaft 241 moves in the upward and downward directions, i.e., the z-axis directions. Further, the encoder 283 is configured to detect the amount of movement of the shaft 241 in the z-axis directions relative to the second arm 23.

Further, various end effectors are detachably coupled to the distal end portion of the shaft 241. The end effector is not particularly limited to, but includes e.g. one that grips an object to be transported, one that processes an object to be processed, and one used for inspection. In the embodiment, the end effector 7 is detachably coupled.

The end effector 7 may be a component element of the robot 2 or not in the embodiment.

As shown in FIG. 1, the force detection unit 5 detects a force applied to the robot 2, i.e., a force applied to the robot arm 20 and the base 21. In the embodiment, the force detection unit 5 is provided at the downside, i.e., at the −z-axis side of the base 21 and supports the base 21 from the downside.

The position where the force detection unit 5 is placed is not limited to that described above, but may be e.g. the lower end portion of the shaft 241 or the respective joint portions.

The force detection unit 5 may include e.g. a plurality of elements formed using a piezoelectric material such as quartz crystal and outputting electric charge when subjected to an external force. The control apparatus 8 may perform conversion into an external force applied to the robot arm 20 according to the amounts of electric charge. Further, such a piezoelectric material can adjust the direction to generate the electric charge when subjected to the external force according to the direction in which the material is placed.

Next, the control apparatus 8 will be explained.

As shown in FIG. 1, the control apparatus 8 is provided inside of the base 21 in the embodiment. Further, as shown in FIG. 2, the control apparatus 8 has a function of controlling driving of the robot 2 and is electrically coupled to the above described respective parts of the robot 2. The control apparatus 8 has a CPU (Central Processing Unit) 81, a storage unit 82, and a communication unit 83. These respective units are connected communicably with one another via e.g. a bus.

The CPU 81 reads and executes various programs etc. stored in the storage unit 82. Command signals generated in the CPU 81 are transmitted to the respective parts of the robot 2 via the communication unit 83. Thereby, the robot arm 20 may execute a predetermined work under a predetermined condition.

The storage unit 82 stores various programs etc. that can be executed by the CPU 81. The storage unit 82 includes e.g. a volatile memory such as a RAM (Random Access Memory), a nonvolatile memory such as a ROM (Read Only Memory), and a detachable external storage device.

The communication unit 83 respectively transmits and receives signals between the respective parts of the robot 2 and the teaching apparatus 3 using an external interface such as e.g. a wired LAN (Local Area Network) or a wireless LAN.

Next, the teaching apparatus 3 will be explained.

As shown in FIG. 2, the teaching apparatus 3 has a function of designating a motion program for the robot 2. Specifically, the teaching apparatus 3 inputs a position and an attitude of the robot arm 20 to the control apparatus 8.

As shown in FIG. 2, the teaching apparatus 3 has a CPU (Central Processing Unit) 31, a storage unit 32, a communication unit 33, and a display unit 34. The teaching apparatus 3 is not particularly limited to, but includes e.g. a tablet, personal computer, and smartphone.

The CPU 31 reads and executes various programs etc. stored in the storage unit 32. A command signal generated in the CPU 31 is transmitted to the control apparatus 8 of the robot 2 via the communication unit 33. Thereby, the robot arm 20 may execute a predetermined work under a predetermined condition.

The storage unit 32 stores various programs etc. that can be executed by the CPU 31. The storage unit 32 includes e.g. a volatile memory such as a RAM (Random Access Memory), a nonvolatile memory such as a ROM (Read Only Memory), and a detachable external storage device.

The communication unit 33 transmits and receives signals between the control apparatus 8 and itself using an external interface such as e.g. a wired LAN (Local Area Network) or a wireless LAN.

The display unit 34 includes various displays. In the embodiment, as an example, a touch panel configuration, i.e., a configuration in which the display unit 34 has a display function and an input operation function is explained.

Note that the display unit is not limited to the configuration, but may separately include an input operation unit. In this case, the input operation unit includes e.g. a mouse and a keyboard. Or, a configuration using all of a touch panel, a mouse, and a keyboard may be employed.

Next, the motor drive system will be explained using FIGS. 2 and 3.

The motor drive system 10 includes the motor 251 to motor 281, the drive control circuit 25A to drive control circuit 28A, the power supply device 4, and the monitoring circuit 6.

As shown in FIG. 3, the power supply device 4 has an alternating-current power supply 41 actuated under control by the control apparatus 8, a first converter 42, and a second converter 43. The first converter 42 and the second converter 43 are AC/DC converters and convert the alternating current output by the alternating-current power supply 41 into a direct current and supply the current to the drive control circuit 25A to drive control circuit 28A. The first converter 42 and the second converter 43 are series-coupled. Thereby, the electric power output to the drive control circuit 25A to drive control circuit 28A may be increased. Therefore, the converters are advantageous when the robot arm 20 has a heavier weight or the robot arm 20 is actuated at a higher velocity.

The first converter 42 is coupled to a reference potential, i.e., the ground potential. A potential difference of the first converter 42 from the ground potential is referred to as "voltage V1" as a first voltage output by the first converter 42. Further, a potential difference of the second converter 43 from the ground potential is a sum value of the voltage V1 of the first converter 42 and the output voltage output by the second converter 43 and referred to as "voltage V2" as a second voltage. In this manner, the voltage V2 is supplied to the drive control circuit 25A to drive control circuit 28A.

A first power supply 4A is formed by the alternating-current power supply 41 and the first converter 42, and a second power supply 4B is formed by the alternating-current power supply 41 and the second converter 43. These first power supply 4A and second power supply 4B are series-coupled.

Note that the first converter 42 and the second converter 43 are the AC/DC converters in the embodiment, however, when a direct-current power supply is used in place of the alternating-current power supply 41, may be DC/DC converters.

As shown in FIG. 3, the monitoring circuit 6 has a first detection circuit 61, a second detection circuit 62, a switch 63, and a switching circuit 64. The monitoring circuit 6 has a function of monitoring the voltage V1 and the voltage V2 and, when these voltages are equal to or larger than set values, reducing, preferably, shutting off electric power supply to the drive control circuit 25A to drive control circuit 28A.

As shown in FIG. 4, the first detection circuit 61 has a first comparator 611. The first comparator 611 compares two voltage values input in addition to the voltage input for driving and outputs a signal based on the comparison result. As shown in FIG. 4, the voltage V1 for detection and a preset first set value V1' are supplied to the first comparator 611. Note that the voltage V1 is supplied to the first comparator 611 as the voltage for driving.

Further, as shown in FIG. 4, the voltage V2 for detection is stepped down by a resistance element R11 and a resistance element R12 and input to the first comparator 611. On the other hand, the voltage corresponding to the first set value V1', i.e., the voltage V1 supplied for driving is also stepped down and adjusted by a resistance element R13 and a resistance element R14 and input to the first comparator 611. Note that the step-down ratios of the voltage V1 and the first set value V1' are the same.

Further, the first comparator 611 compares the voltage V1 with the first set value V1' and outputs a voltage corresponding to the comparison result. Then, the output voltage is A/D-converted and input to the switching circuit 64 shown in FIG. 3.

As shown in FIG. 5, the second detection circuit 62 has a second comparator 621. The second comparator 621 compares two voltage values input in addition to the voltage input for driving and outputs a signal based on the comparison result. As shown in FIG. 5, the voltage V2 for detection and a preset second set value V2' are supplied to the second comparator 621. Note that the voltage V1 is supplied to the second comparator 621 as the voltage for driving.

Further, as shown in FIG. 5, the voltage V2 for detection is stepped down by a resistance element R21 and a resistance element R22 and input to the second comparator 621. On the other hand, the voltage corresponding to the second set value V2', i.e., the voltage V1 supplied for driving is also stepped down and adjusted by a resistance element R23 and a resistance element R24 and input to the second comparator 621. Note that the step-down ratios of the voltage V2 and the second set value V2' are the same.

Further, the second comparator 621 compares the voltage V2 with the second set value V2' and outputs a voltage corresponding to the comparison result. Then, the output voltage is A/D-converted and input to the switching circuit 64 shown in FIG. 3.

The switch 63 for switching between the energization state and the shut-off state is provided between the second power supply 4B and the drive control circuit 25A to drive control circuit 28A. The switch 63 is switched between ON and OFF by the switching circuit 64. The switch 63 includes e.g. a semiconductor switch that switches energization and shut-off of the drive control circuit 25A to drive control circuit 28A by changing the energization condition from the switching circuit 64.

The switching circuit 64 has at least one processor and switches between ON and OFF of the switch by changing the energization condition of the switch 63. Further, the switching circuit 64 outputs a signal for switching the switch 63 based on the detection results of the first detection circuit 61 and the second detection circuit 62. Specifically, when receiving a signal indicating V1≥V1' from the first comparator 611 or when receiving a signal indicating V2 V2' from the second comparator 621, the circuit turns OFF the switch 63 and shuts off the energization of the drive control circuit 25A to drive control circuit 28A. Thereby, the motor 251 to motor 281 may be stopped.

Note that the first set value V1' and the second set value V2' are the values set according to the output voltages of the first power supply 4A and the second power supply 4B so that, when the output voltages exceed the values, the first power supply 4A and the second power supply 4B may be regarded as being failed for some reason. Accordingly, in the motor drive system 10, for example, even when the output voltages become excessively higher due to abnormalities of the first power supply 4A and the second power supply 4B, the voltages supplied to the drive control circuit 25A to drive control circuit 28A without change may be prevented or suppressed. Therefore, safety may be increased.

Here, even when the output voltages become higher due to abnormalities of the first power supply 4A and the second power supply 4B, prevention of breakdown of component parts by the output voltages is necessary for the first detection circuit 61 and the second detection circuit 62. That is, it is necessary to increase the failure voltages of the first detection circuit 61 and the second detection circuit 62. To simply increase the failure voltages, for example, insulating parts may be upsized, however, that causes upsizing of the first detection circuit 61 and the second detection circuit 62 and further causes higher cost. In the viewpoint, in the present disclosure, as described above, the first detection circuit 61 and the second detection circuit 62 are driven at the voltage V1 lower than the voltage V2 output by the power supply device 4, and both the voltage V1 of the first power supply 4A and the voltage V2 output by the power supply device 4 are monitored using the first detection circuit 61 and the second detection circuit 62. Further, the voltages for driving the first detection circuit 61 and the second detection circuit 62 and the first set value V1' and second set value V2' have correlations. Accordingly, the first detection circuit 61 and the second detection circuit 62 are driven at the voltage V1, that is, the electric power for driving is supplied from between the first power supply 4A and the second power supply 4B, and thereby, the first set value V1' and the second set value V2' may be made smaller. Therefore, with that, the step-down ratios of the detected voltage V1 and voltage V2 may be increased. As a result, even when smaller insulating parts are used, the parts may withstand higher voltages. As described above, according to the present disclosure, the size and cost may be reduced.

Note that the monitoring circuit 6 may be mounted on the same board as that of the control apparatus 8 or a different board. That is, the monitoring circuit 6 may be contained in the control apparatus 8 or provided in a position different from that of the control apparatus 8 as a monitoring device.

Further, as described above, the monitoring circuit 6 has the first detection circuit 61 that detects the voltage V1 as the first voltage, the second detection circuit 62 that detects the voltage V2 as the second voltage, the switch 63 that switches between the energization of the drive control circuit 25A to drive control circuit 28A and the shut-off of the electric power to the drive control circuit 25A to drive control circuit 28A, and the switching circuit 64 that outputs the signal for switching the switch 63 based on the detection results of the first detection circuit 61 and the second detection circuit 62. Thereby, even when the output voltage of the power supply device 4 becomes excessively higher, the voltage supplied to the drive control circuit 25A to drive control circuit 28A without change may be prevented or suppressed. Therefore, the safety may be increased.

Note that, not limited to the configuration that switches between the energization state and the shut-off state of the drive control circuit 25A to drive control circuit 28A by the switching operation of the switch 63, but e.g. a configuration that passes power to another circuit may be employed. Even in this case, excessive electric power supply to the drive control circuit 25A to drive control circuit 28A may be prevented or suppressed.

In the motor drive system 10, the energization state and the shut-off state are collectively switched for the drive control circuit 25A to drive control circuit 28A, however, the present disclosure is not limited to that. The energization state and the shut-off state may be switched for at least one of the drive control circuit 25A to drive control circuit 28A.

Further, the first power supply 4A and the second power supply 4B may include batteries such as secondary cells.

The first detection circuit 61 has the first comparator 611 that compares the voltage V1 as the first voltage and the first set value V1', and the second detection circuit 62 has the second comparator 621 that compares the voltage V2 as the second voltage and the second set value V2'. Thereby, whether or not both the voltage V1 of the first power supply 4A and the voltage V2 output by the power supply device 4 are normal values may be monitored.

The electric power for driving is respectively supplied to the first comparator 611 and the second comparator 621 from between the first power supply 4A and the second power supply 4B. Thereby, the above described effects may be exerted more reliably.

The motor drive system 10 includes a cooling unit (not shown) that cools the power supply device 4. The cooling unit includes a fan for cooling by sending air and a Peltier element. Further, it is preferable that the cooling unit preferentially cools the first power supply 4A having a higher load factor than the second power supply 4B. Specifically, it is preferable that the cooling unit is placed at the opposite side to the second power supply 4B with respect to the first power supply 4A and preferentially cools the first power supply 4A. Thereby, the power supply device 4 may be efficiently cooled.

As described above, the motor drive system 10 includes the cooling unit placed at the opposite side to the second power supply 4B with respect to the first power supply 4A. Thereby, the power supply device 4 may be efficiently cooled.

As described above, the motor drive system 10 includes the motor 251 to motor 281, the drive control circuit 25A to drive control circuit 28A that control driving of the motor 251 to motor 281, the power supply device 4 having the first power supply 4A coupled to the reference potential and the second power supply 4B series-coupled to the first power supply 4A, and supplying the voltage V2 as the second voltage as the sum value of the voltage V1 as the first voltage as the output voltage of the first power supply 4A and the output voltage of the second power supply 4B to the drive control circuit 25A to drive control circuit 28A, and the monitoring circuit 6 that detects the voltage V1 and the voltage V2 and shuts off or reduces electric power supply to the drive control circuit 25A to drive control circuit 28A when the detected voltage V1 becomes equal to or larger than the predetermined first set value V1' or the detected voltage V2 becomes equal to or larger than the predetermined second set value V2'. Further, the electric power for driving is supplied to the monitoring circuit 6 from between the first power supply 4A and the second power supply 4B. Thereby, even when the smaller insulating parts are used, the parts may withstand higher voltages. Therefore, the size and cost of the motor drive system 10 may be reduced.

The robot 2 includes the robot arm 20 and the motor drive system 10. That is, the robot 2 includes the robot arm 20, the motor 251 to motor 281 that drive the robot arm 20, the drive control circuit 25A to drive control circuit 28A that control driving of the motor 251 to motor 281, the power supply device 4 having the first power supply 4A coupled to the reference potential and the second power supply 4B series-coupled to the first power supply 4A, and supplying the voltage V2 as the second voltage as the sum value of the voltage V1 as the first voltage as the output voltage of the first power supply 4A and the output voltage of the second power supply 4B to the drive control circuit 25A to drive control circuit 28A, and the monitoring circuit 6 that detects the voltage V1 and the voltage V2 and shuts off or reduces electric power supply to the drive control circuit 25A to drive control circuit 28A when the detected voltage V1 becomes equal to or larger than the predetermined first set value V1' or the detected voltage V2 becomes equal to or larger than the predetermined second set value V2'. Further, the electric power for driving is supplied to the monitoring circuit 6 from between the first power supply 4A and the second power supply 4B. Thereby, even when smaller insulating parts are used, the parts may withstand higher voltages. Therefore, the size and cost of the motor drive system 10 may be reduced.

In place of the configuration that switches energization and shut-off of the drive control circuit 25A to drive control circuit 28A by the switch 63 that switches ON and OFF based on the detection results of the first detection circuit 61 and the second detection circuit 62, a configuration that changes the circuit to be energized may be employed. That is, the switch 63 may switch to energize a first circuit having a first resistor with the first resistance value R1 when the detected voltage V1 is smaller than the predetermined first set value V1' or the detected voltage V2 is smaller than the predetermined second set value V2', and energize a second circuit having a second resistor with the second resistance value R2 larger than the first resistance value R1 when the detected voltage V1 is equal to or larger than the predetermined first set value V1' or the detected voltage V2 is equal to or larger than the predetermined second set value V2'. In this case, the electric power supplied to the drive control circuit 25A to drive control circuit 28A when the second circuit is energized may be reduced compared to the electric power supplied to the drive control circuit 25A to drive control circuit 28A when the first circuit is energized.

Second Embodiment

Figure 6:
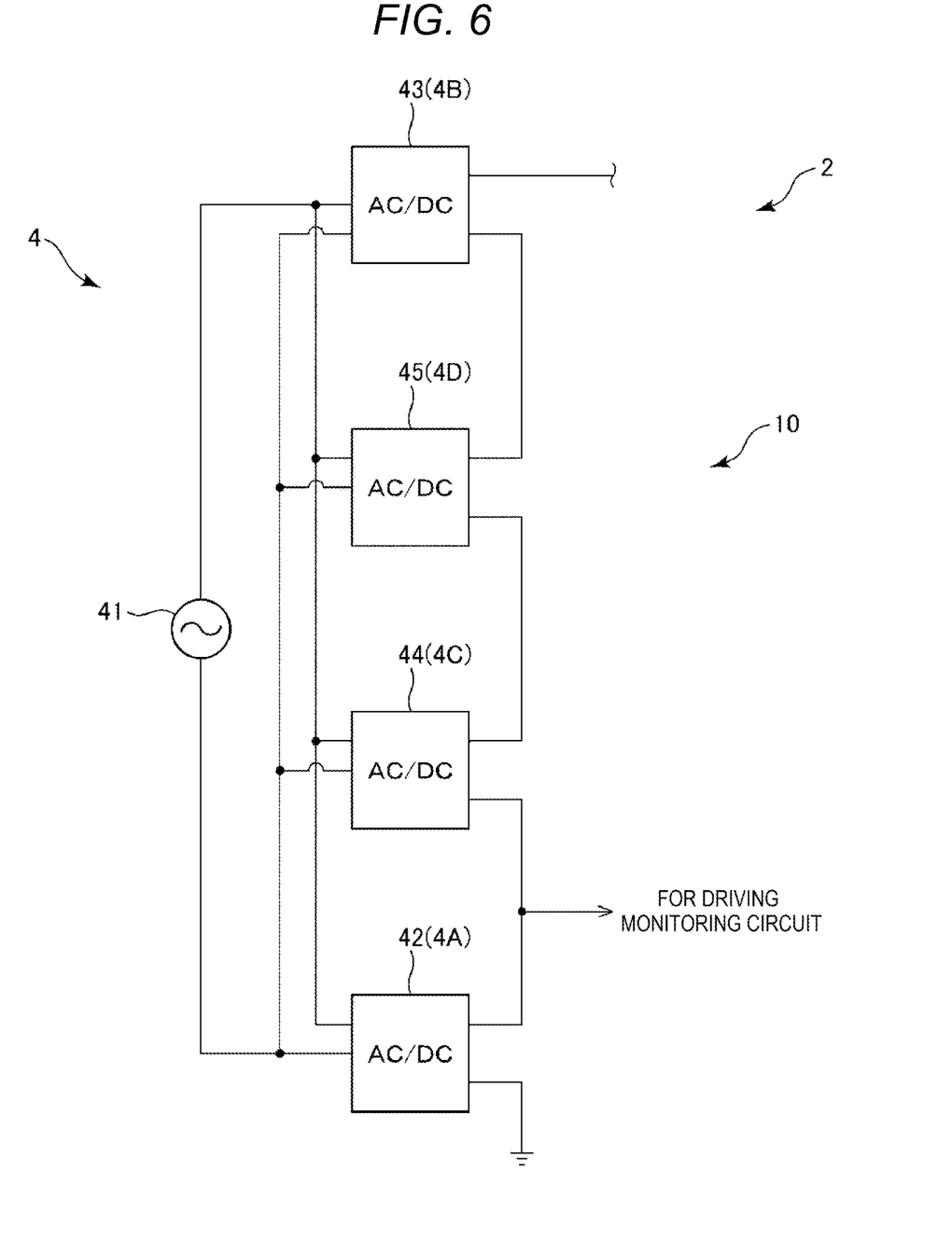
FIG. 6 is a functional block diagram showing a power supply device provided in a second embodiment of the motor drive system according to the present disclosure.

FIG. 6 is a functional block diagram showing a power supply device provided in a second embodiment of the motor drive system according to the present disclosure.

As below, the second embodiment of the motor drive system and the robot according to the present disclosure will be explained. In the following description, the explanation will be made with a focus on the differences from the first embodiment and the explanation of the same items will be omitted.

As shown in FIG. 6, the power supply device 4 has a third converter 44 and a fourth converter 45 in addition to the first converter 42 and the second converter 43. The first converter 42 to fourth converter 45 are series-coupled. The third converter 44 and the fourth converter 45 are provided between the first converter 42 and the second converter 43, and the potentials are higher in the order of the first converter 42, the third converter 44, the fourth converter 45, the second converter 43 from the reference potential side.

A third power supply 4C is formed by the third converter 44 and the alternating-current power supply 41, and a fourth power supply 4D is formed by the fourth converter 45 and the alternating-current power supply 41.

Further, a voltage for driving of the monitoring circuit 6 is supplied from between the first converter 42 and the third converter 44. Thereby, even when three or more power supplies are provided, the voltage for driving of the monitoring circuit 6 may be made smaller as far as possible. Therefore, the size and cost of the motor drive system 10 may be reduced.

As described above, the motor drive system 10 of the embodiment includes the third power supply 4C series-coupled between the first power supply 4A and the second power supply 4B, and the electric power for driving is supplied to the monitoring circuit 6 from between the first converter 42 and the second converter 43. Thereby, the voltage for driving of the monitoring circuit 6 may be made smaller as far as possible. Therefore, the size and cost of the motor drive system 10 may be reduced.

As above, the motor drive system and the robot according to the present disclosure are explained based on the illustrated embodiments, however, the present disclosure is not limited to those. The configurations of the respective parts may be replaced by arbitrary configurations having the same functions. Further, other arbitrary configurations may be respectively added to the motor drive system and the robot according to the present disclosure.

What is claimed is:

1. A motor drive system comprising:
   a motor;
   a drive control circuit that controls driving of the motor;
   a power supply device having a first power supply coupled to a reference potential and a second power supply series-coupled to the first power supply, and supplying a second voltage as a sum value of a first voltage as an output voltage of the first power supply and an output voltage of the second power supply to the drive control circuit; and
   a monitoring circuit that detects the first voltage and the second voltage and shuts off or reduces electric power supply to the drive control circuit when the detected first voltage becomes equal to or larger than a predetermined first set value or the detected second voltage becomes equal to or larger than a predetermined second set value, wherein
   electric power for driving is supplied to the monitoring circuit from between the first power supply and the second power supply.

2. The motor drive system according to claim 1, wherein the monitoring circuit includes a first detection circuit that detects the first voltage, a second detection circuit that detects the second voltage, a switch that switches energization of the drive control circuit and shut-off of electric power to the drive control circuit, and a switching circuit that outputs a signal for switching the switch based on detection results of the first detection circuit and the second detection circuit.

3. The motor drive system according to claim 2, wherein the first detection circuit has a first comparator that compares the first voltage and the first set value, and the second detection circuit has a second comparator that compares the second voltage and the second set value.

4. The motor drive system according to claim 3, wherein electric power for driving is respectively supplied to the first comparator and the second comparator from between the first power supply and the second power supply.

5. The motor drive system according to claim 1, further comprising a third power supply series-coupled between the first power supply and the second power supply, wherein
   electric power for driving is supplied to the monitoring circuit from between the first power supply and the third power supply.

6. The motor drive system according to claim 1, further comprising a cooling unit placed at an opposite side to the second power supply with respect to the first power supply.

7. A robot comprising:
   a robot arm;
   a motor that drives the robot arm;
   a drive control circuit that controls driving of the motor;
   a power supply device having a first power supply coupled to a reference potential and a second power supply series-coupled to the first power supply, and supplying a second voltage as a sum value of a first voltage as an output voltage of the first power supply and an output voltage of the second power supply to the drive control circuit; and
   a monitoring circuit that detects the first voltage and the second voltage and shuts off or reduces electric power supply to the drive control circuit when the detected first voltage becomes equal to or larger than a predetermined first set value or the detected second voltage becomes equal to or larger than a predetermined second set value, wherein
   electric power for driving is supplied to the monitoring circuit from between the first power supply and the second power supply.

* * * * *